US009644289B2

(12) United States Patent
Adachi et al.

(10) Patent No.: US 9,644,289 B2
(45) Date of Patent: May 9, 2017

(54) POLYURETHANE ELASTIC FIBER

(75) Inventors: Masayuki Adachi, Tokyo (JP);
Takamasa Mori, Tokyo (JP); Junichi Kojima, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 0 days.

(21) Appl. No.: 14/004,821

(22) PCT Filed: Mar. 13, 2012

(86) PCT No.: PCT/JP2012/056414
§ 371 (c)(1),
(2), (4) Date: Sep. 12, 2013

(87) PCT Pub. No.: WO2012/124691
PCT Pub. Date: Sep. 20, 2012

(65) Prior Publication Data
US 2014/0005348 A1 Jan. 2, 2014

(30) Foreign Application Priority Data
Mar. 14, 2011 (JP) ................................ 2011-055950

(51) Int. Cl.
*D01F 6/96* (2006.01)
*B29D 99/00* (2010.01)
*C08G 18/48* (2006.01)
*C08G 18/76* (2006.01)
*C08G 18/08* (2006.01)
*C08G 18/10* (2006.01)
*C08G 18/28* (2006.01)
*C08G 18/32* (2006.01)
*D01D 5/04* (2006.01)
*D01F 6/70* (2006.01)

(52) U.S. Cl.
CPC ........... *D01F 6/96* (2013.01); *B29D 99/0078* (2013.01); *C08G 18/0852* (2013.01); *C08G 18/10* (2013.01); *C08G 18/3228* (2013.01); *C08G 18/4825* (2013.01); *C08G 18/4837* (2013.01); *C08G 18/4845* (2013.01); *C08G 18/4854* (2013.01); *C08G 18/4858* (2013.01); *C08G 18/7671* (2013.01); *D01D 5/04* (2013.01); *D01F 6/70* (2013.01)

(58) Field of Classification Search
CPC ............ C08G 18/3228; C08G 18/4825; C08G 18/4837; C08G 18/4845; C08G 18/4854; C08G 18/4858; C08G 18/10; C08G 18/7671; C08G 18/0852; C08G 18/285; B29D 99/0078; D01F 6/96; D01F 6/70; D01D 5/04

See application file for complete search history.

(56) References Cited

U.S. PATENT DOCUMENTS

| 4,071,492 A | 1/1978 | Bethea et al. |
| 4,224,432 A | 9/1980 | Pechhold et al. |
| 5,000,899 A | 3/1991 | Dreibelbis et al. |
| 5,879,799 A | 3/1999 | Yosizato et al. |
| 5,948,875 A | 9/1999 | Liu et al. |
| 2006/0045996 A1 | 3/2006 | Fujibayashi et al. |
| 2006/0270821 A1 | 11/2006 | Palmer, Jr. et al. |
| 2006/0276613 A1 * | 12/2006 | Yilgor et al. ................. 528/76 |
| 2009/0247658 A1 | 10/2009 | Kobayashi et al. |

FOREIGN PATENT DOCUMENTS

| CN | 1646590 A | 7/2005 |
| CN | 101484496 A | 7/2009 |
| EP | 0 343 985 B1 | 8/1994 |
| JP | 2-19511 | 1/1990 |
| JP | 3717186 | 9/2005 |
| JP | 2006144192 | 6/2008 |
| JP | 2008-184722 | 8/2008 |
| JP | 2008-184722 A | 8/2008 |
| JP | 2008-248137 | 10/2008 |
| JP | 4346270 | 7/2009 |
| JP | 4425793 | 12/2009 |
| WO | WO 01/02630 A1 * | 1/2001 |
| WO | WO 01/32731 A1 | 5/2001 |
| WO | WO 2004/033514 A2 | 4/2004 |

OTHER PUBLICATIONS

Supplementary European Search Report for EP Application No. 12757850.8 dated Jul. 9, 2014.
Omura, J., et al., "Structure and Mechanical Properties of Polyurethane Elastic Fibers", Journal of the Society of Rubber Industry, Nov. 15, 2000, vol. 73, No. 11, pp. 576-565, tables 4, 5.
English-language International Search Report from the Japanese Patent Office mailed May 29, 2012, for International Application No. PCT/JP2012/056414.
Omura, J., et al., "Structure and Mechanical Properties of Polyurethane Elastic Fibers", Journal of the Society of Rubber Industry, Nov. 15, 2000, vol. 73, No. 11, pp. 578-585, tables 4, 5.
"Polyurethanes from Copolymers of Tetrahydrofuran," Research Disclosure 881:8 (1971) 47 (anonymous).

* cited by examiner

*Primary Examiner* — Rabon Sergent
(74) *Attorney, Agent, or Firm* — Finnegan, Henderson, Farabow, Garrett & Dunner, LLP

(57) ABSTRACT

Provided are novel polyurethane elastic fibers having a high recovery stress, low hysteresis loss, and high heat resistance. The polyurethane elastic fibers of the present invention are polyurethane elastic fibers formed from a polyurethaneurea obtained from a copolyalkylene ether diol produced from different $C_{2-10}$ alkylene ethers; a diisocyanate; and a diamine, the polyurethane elastic fibers being characterized in that the polyurethaneurea has a hard segment percentage of 14.0% to 25.0% as defined by formula (1): hard segment percentage (%)=(urea moiety number-average molecular weight)/{(urea moiety number-average molecular weight)+(moiety segment number-average molecular weight)}×100 (formula (1)).

8 Claims, 3 Drawing Sheets

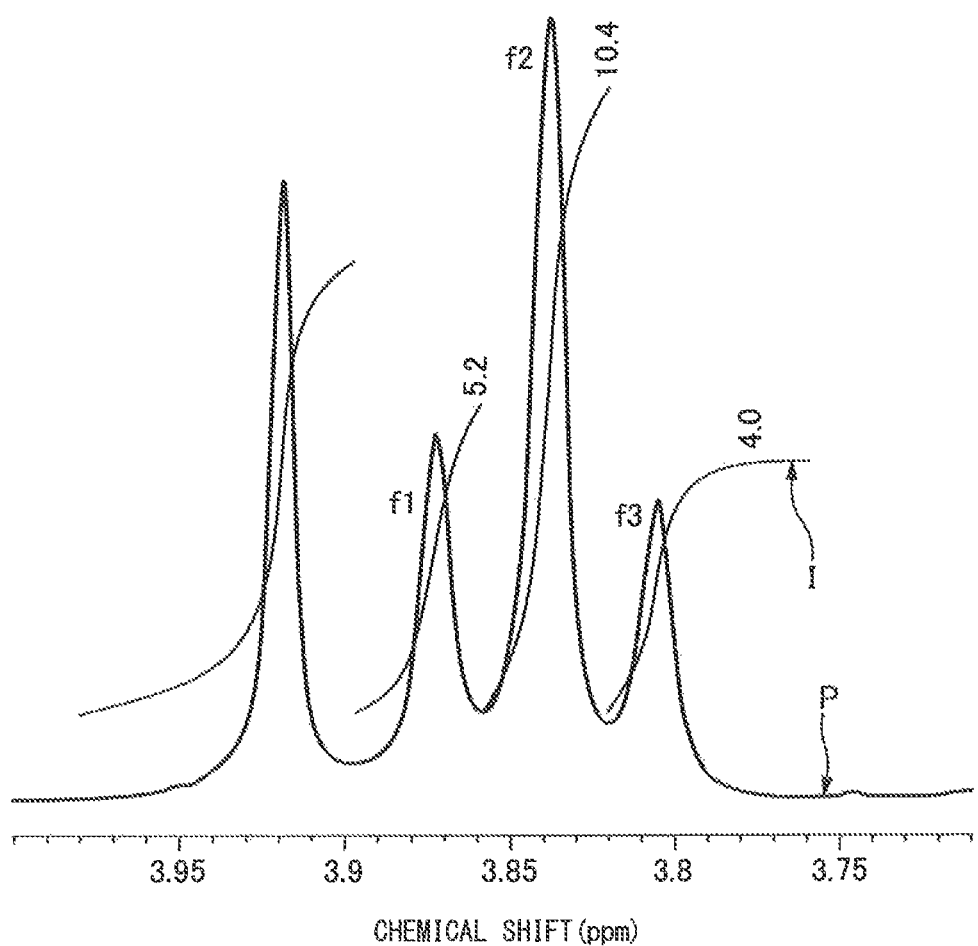

POLYURETHANE ELASTIC FIBER

TECHNICAL FIELD

The present invention relates to a novel elastic polyurethane fiber having a high recovery stress, a low hysteresis loss, and a high heat resistance.

BACKGROUND ART

Elastic polyurethane fibers are widely used in sport clothing such as swimming costumes and stockings, general clothing such as innerwear, outerwear, and stockings, hygienic articles such as diapers, and industrial materials.

When elastic polyurethane fibers are used in these articles, elastic polyurethane fibers which can provide the articles having a lower thickness, a lighter weight, and a higher performance are increasingly demanded. Especially in recent years, interest has been focused on products such as sport clothing and innerwear with enhanced fit during wear, and stockings and girdles which provide higher support during wear compared with related articles and which have a superior ability to temporarily alter the wearer's body shape and a superior ability to reduce fatigue. These sectors have strongly demanded an elastic polyurethane fiber which imparts comparable stretch in a smaller amount relative to related fibers to provide a thinner fabric having a lighter weight and a high transparency, and which imparts higher stretch in the same amount to provide a higher function.

As used herein, "stretch" refers to stretch stress related to resistance when clothes are about to be worn and recovery stress related to fit when clothes are being worn. Higher stretch stress is not always preferred. When clothing has an extremely high stretch stress, the clothing is made difficult to stretch and hard to put on. Thus, clothing which has a similar stretch stress compared to the related articles and thus is easy to put on and which has a higher recovery stress and a higher fit compared with the related articles is demanded. In other words, an elastic polyurethane fiber, having a high recovery stress and a low hysteresis loss after stretch and recovery is demanded. An elastic polyurethane fiber having a high heat resistance closely related to the processability such as knitting, weaving, and braiding is also demanded.

Patent Document 1 discloses an elastic polyurethane fiber which includes a polyurethaneurea prepared from a copolyalkylene ether diol including different $C_{2-10}$ alkylene ethers, the polyurethane including urethane moieties and urea moieties having a number average molecular weight within a specified range. Although the elastic polyurethane fiber has a low hysteresis loss, the elastic fiber has a low recovery stress, because the polyurethane is designed to provide a low stretch stress.

Patent Documents 2, 3, 4, and 5 described below disclose an elastic polyurethane yarn prepared by, for example, using a specified copolyether diol or combining various diamines to provide certain characteristics such as soft stretch, easy set, and damp heat creep resistance. With these methods, however, it is difficult to produce an elastic polyurethane fiber having a high recovery stress, a low hysteresis loss, and a high heat resistance.

PRIOR ART DOCUMENTS

Patent Documents

Patent Document 1: Japanese Patent No. 3717186
Patent Document 2: Japanese Laid-open Patent Publication No. 2005-144192
Patent Document 3: Japanese Patent No. 2897254
Patent Document 4: Japanese Patent No. 4425793
Patent Document 5: Japanese Patent No. 4346270

SUMMARY OF THE INVENTION

Problems to be Solved by the Invention

The problem to be solved by the present invention is to provide a novel elastic polyurethane fiber having a high recovery stress, a low hysteresis loss, and a high heat resistance.

Means of Solving the Problems

Through the extensive research and experiments to solve the above problems, the present inventors have unexpectedly found that the above problems can be solved by preparing a polyurethane urea from a copolyalkylene ether diol including different $C_{2-10}$ alkylene ethers, a diisocyanate, and a diamine, such that the polyurethaneurea has a hard segment content, which is a content of the urea moieties, within a specified range, and have completed the present invention.

In particular, the present invention relates to:

[1] an elastic polyurethane fiber including a polyurethaneurea which is prepared from a copolyalkylene ether diol including $C_{2-10}$ different alkylene ethers, a diisocyanate, and to diamine, wherein the polyurethaneurea has a hard segment content of from 14.0% to 25.0% inclusive, as defined by Equation (1) below:

Hard Segment Content (%)=(Number Average Molecular Weight of Urea Moieties)/{(Number Average Molecular Weight of Urethane Moieties)+(Number Average Molecular Weight of Urea Moieties)}×100     Equation (1);

[2] the elastic polyurethane fiber according to [1], wherein the polyurethaneurea has a hard segment content of from 15.5% to 22.0% inclusive;

[3] the elastic polyurethane fiber according to [1] or [2], wherein the diamine is a combination of a primary linear or branched aliphatic diamine which includes, between the two amino groups, an alkyl moiety containing 3 or less carbon atoms and a secondary linear or branched aliphatic diamine which is different from the primary diamine and which includes, between the two amino groups, an alkyl moiety containing 3 or less carbon atoms;

[4] the elastic polyurethane fiber according to [3], wherein the overall diamines include the secondary diamine in a molar amount of 2-20 mole %;

[5] the elastic polyurethane fiber according to any one of [1]-[4], wherein the copolyalkylene ether diol has a number average molecular weight of 1000-3000;

[6] the elastic polyurethane fiber according to any of [1]-[5], wherein the copolyalkylene ether diol includes a tetramethylene group and a branched alkylene group;

[7] the elastic polyurethane fiber according to any of [1]-[6], wherein the fiber has a specific recovery stress at 200% elongation in the third cycle in a repeated 300% stretch and recovery test of a value being equal to or more than a critical specific recovery stress defined by Equation (6) below:

Critical Specific Recovery Stress $(cN/\text{dtex})=0.0320-6.43\times10^{-6}\times D$     Equation (6)

wherein D is the linear density (dtex) of the polyurethane elastic fiber; and

[8] a process for producing the elastic polyurethane fiber according to any of [1]-[7], the process including:

reacting a copolyalkylene ether diol including different $C_{2-10}$ alkylene ether dials with a diisocyanate to synthesize an urethane prepolymer including isocyanate at both ends, adding a diamine to the resultant urethane prepolymer in an inert solvent to produce a polyurethaneurea solution which contains polyurethaneurea having a hard segment content of from 14.0% to 25.0% inclusive, as defined by Equation (1) below:

Hard Segment Content (%)=(Number Average Molecular Weight of Urea Moieties)/{(Number Average Molecular Weight of Urethane Moieties)+(Number Average Molecular Weight of Urea Moieties)}×100 Equation (1), and dry spinning the resultant polyurethaneureasolution to produce the elastic polyurethane fiber.

Effects of the Invention

The elastic polyurethane fiber of the present invention has a high recovery stress, a low hysteresis loss, and a high heat resistance.

BRIEF DESCRIPTION OF THE DRAWINGS

FIG. 3 illustrates an exemplary NMR spectrum of the elastic polyurethane fiber of the present invention.

MODE FOR CARRYING OUT THE INVENTION

Figure 1:
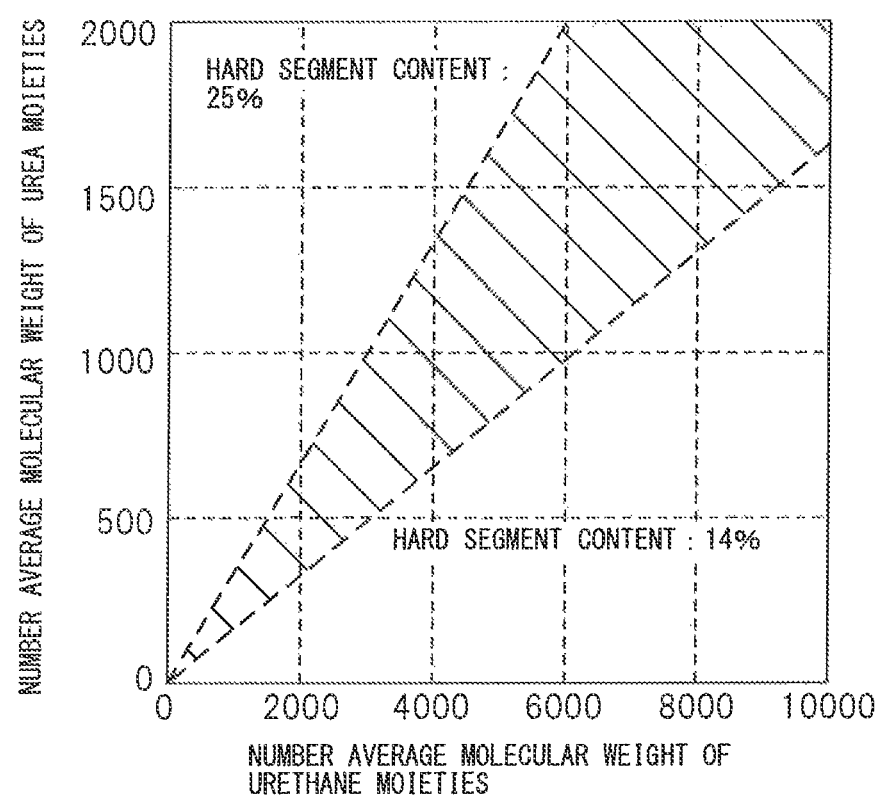
FIG. 1 illustrates a range of the hard segment content of the polyurethaneurea of the present invention, the range being represented by hatched lines. The slanted boundaries in FIG. 1 are lines drawn between the points of 14.0% of the hard segment content and between the points of 25.0% of the hard segment content.

Now, the present invention will be described in detail.

The elastic polyurethane fiber of the present invention includes a polyurethaneurea which is prepared from a copolyalkylene ether diol, a diisocyanate, and a diamine.

The copolyalkylene ether diol in the present invention includes at least two or more linear $C_{2-10}$ alkylene groups such as ethylene, propylene, tetramethylene, pentamethylene, hexamethylene, and decamethylene groups, or branched $C_{2-10}$ alkylene groups such as 1,2-propylene, 3-methyltetramethylene, 3-methylpentamethylene, and 2,2-dimethylpropylene groups which are connected through an ether linkage. All of the two or more alkylene groups may be linear, or all of the alkylene groups may be branched. Alternatively, the two or more alkylene groups may be a combination of linear and branched alkylene groups. The two or more alkylene groups may be connected through an ether linkage in an alternating, a blocky or a random manner. When the most abundant alkylene group of the two or more alkylene groups is referred to as "main component", and other alkylene groups copolymerized with the main component are referred to as "copolymerized component", the copolyalkylene ether diol preferably has a copolymerization ratio, which is a content of the copolymerized component, of 4 mole % or more and 40 mole % or less, and more preferably 8 mole % or more and 20 mole % or less, in view of the tenacity and elongation at break of the resulting elastic polyurethane fiber.

Preferably, the copolyalkylene ether diol includes two polyalkylene groups including a linear alkylene group as the main component and a branched alkylene group as the copolymerized component, in view of a preferred combination of stretch property, water resistance, light resistance, and abrasion resistance of the resulting elastic polyurethane fiber. More preferably, the linear alkylene group as the main component is a tetramethylene group, and the branched alkylene group as the copolymerized component is a branched $C_{2-10}$ alkylene group such as 1,2-propylene, 3-methyltetramethylene, 3-methylpentamethylene, and 2,2-dimethylpropylene groups. Still, more preferably, the copolyalkylene ether diol includes a tetramethylene group as the main component, and a 3-methyltetramethylene group or a 2,2-dimethylpropylene group as the copolymerized component.

Although the copolyalkylene ether diol may have any number average molecular weight, the polyalkylene ether diol preferably has a number average molecular weight of 1000-3000 and more preferably 1500-2500, in view of elongation at break, abrasion resistance, and stretch stress of the resulting elastic polyurethane fiber.

Examples of the diisocyanate which can be used in the present invention include, but not limited to, aromatic diisocyanates such as 4,4'-diphenylmethane diisocyanate, tolylene diisocyanate, 1,5-naphthalene diisocyanate, 1,4-phenylene diisocyanate, and xylylene diisocyanate; aliphatic diisocyanates such as hexamethylene diisocyanate; and alicyclic diisocyanates such as isophorone diisocyanate and 4,4'-dicyclohexylmethane diisocyanate. They may be used individually, or two or more of them may be used in combination. It is preferred to use an aromatic diisocyanate which is highly reactive with active hydrogen. Among such aromatic diisocyanates, it is especially preferred to use 4,4'-diphenylmethane diisocyanate, in view of its reactivity and the tenacity of the resulting elastic polyurethane fiber. The 4,4'-diphenylmethane diisocyanate may be combined with 2,4'-diphenylmethane diisocyanate in a molar amount of 20 mole % or less based on the amount of the 2,4'-diphenylmethane diisocyanate.

Examples of the diamine which can be used in the present invention include, but not limited to, linear aliphatic diamine compounds such as hydrazine, ethylenediamine, 1,3-diaminopropane, 1,5-diaminopentane, 1,6-diaminohexane, N-methylethylenediamine, N,N'-dimethylethylenediamine, N-ethylethylenediamine, N,N'-diethylethylenediamine, and N-isopropylethylenediamine; branched aliphatic diamine compounds such as 1,2-diaminopropane, 2-methyl-1,3-diaminopropane, and 3-methyl-1,5-diaminopentane; alicyclic diamine compounds such as 1,3-bis(aminomethyl)cyclohexane; aromatic diamine compounds such as phenylenediamine, xylylenediamine, and 4,4'-diaminodiphenylmethane; and cyclic diamine compounds such as piperazine. These diamines may be used individually, or two or more of them may be used in combination.

It is preferred to use a linear or branched aliphatic diamine which includes, between the two amino groups, an alkyl moiety containing 3 or less carbon atoms, in view of heat resistance of the resulting elastic polyurethane fiber. Use of a diamine containing 3 or less carbon atoms can increase hydrogen bond density of the urea groups in the elastic polyurethane fiber and therefore increase the strength and the heat resistance of the fiber. Examples of the linear or branched aliphatic diamine which contains 3 or less carbon atoms include hydrazine, which includes, between the two amino groups, an alkyl moiety containing no carbon atom, ethylenediamine, which includes, between the two amino groups, an alkyl moiety containing 2 carbon atoms, 1,3-diaminopropane N-methylethylenediamine, N,N'-dimethylethylenediamine, N-ethylethylenediamine, N,N'-dimethylethylenediamine, N-isopropylethylenediamine, and 1,2-diaminopropane which includes, between the two amino groups, an alkyl moiety containing 3 carbon atoms.

It is especially preferred to use a combination of the two diamines: a linear or branched aliphatic diamine which includes, between the two amino groups an alkyl moiety containing 3 or less carbon atoms (hereinafter referred to as "primary diamine") and a linear or branched aliphatic diamine which is different from the primary diamine and which includes, between the two amino groups an alkyl moiety containing 3 or less carbon atoms (hereinafter referred to as "secondary diamine"), in view of stability of the resulting spinning solution, and a preferred combination of stretch and heat resistance of the resulting elastic polyurethane fiber. Suitable examples of a combination of the primary diamine and the secondary diamine include a combination of ethylenediamine and 1,3-diaminopropane, a combination of ethylenediamine and N-ethylethylenediamine, a combination of ethylenediamine and 1,2-diaminopropane, a combination of 1,3-diaminopropane and N-ethylethylenediamine, a combination of 1,3-diaminopropane and 1,2-diaminopropane, and a combination of N-ethylethylenediamine and 1,2-diaminopropane. When a combination of ethylenediamine and 1,3-diaminopropane is used, for example, the primary diamine may be ethylenediamine or 1,3-diaminopropane. When such diamine combination is used, the diamines may be combined in any ratio, but preferably, the primary diamine, which is combined in a higher molar amount compared with the secondary diamine, is combined in a molar amount of 80-98 more %, while the secondary diamine is preferably combined in a molar amount of 2-20 more %. If the secondary diamine is combined in a molar amount of 2 mole % or more, the resulting polyurethane solution can be stabilized. If the secondary diamine is combined in a molar amount of 20 mole % or less, the resulting elastic polyurethane fiber can have a sufficient heat resistance. It is preferred to use a combination of ethylenediamine as the primary diamine and 1,3-diaminopropane, 1,2-diaminopropane, or N-ethylethylenediamine as the secondary diamine, the secondary diamine being combined in a molar amount of 2-20 mole %, in view of a preferred combination of stretch and recovery property and heat resistance of the resulting elastic polyurethane fiber.

An urethanization reaction can be conducted in a known manner as described below to synthesize a polyurethaneurea from the copolyalkylene ether diol, the diisocyanate, and the diamine.

First, the number average molecular weight of the urethane moieties and the number average molecular weight of the urea moieties are determined, such that the resulting polyurethaneurea may have a hard segment content of from 14.0% to 25.0% inclusive, as defined by Equation (1) below:

Hard Segment Content %=(Number Average Molecular Weight of Urea Moieties)/{(Number Average Molecular Weight of Urethane Moieties)+(Number Average Molecular Weight of Urea Moieties)}×100        Equation (1)

Figure 2:
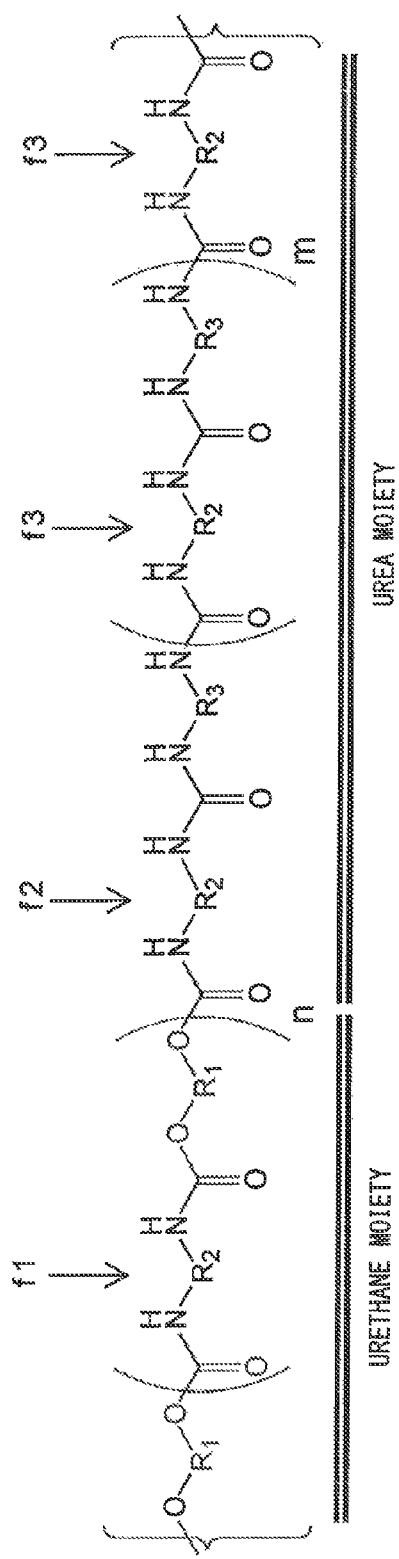
FIG. 2 illustrates an exemplary structural formula of an urethane moiety and an urea moiety in the polyurethaneurea of the present invention.

FIG. 2 illustrates an exemplary structural formula of an urethane moiety and an urea moiety in the polyurethaneurea of the present invention. In FIG. 2, $R_1$ represents a residue of the copolyalkylene ether diol, $R_2$ represents a residue of the diisocyanate, and $R_3$ represents a residue of the diamine. As used herein, the term "urethane moiety" refers to a moiety which is formed by reaction of the copolyalkylene ether diol with the diisocyanate and which includes an urethane linkage. The term "urea moiety" refers to a moiety which is formed by reaction of the diamine with the diisocyanate and which includes an urea linkage.

If the polyurethaneurea has a hard segment content of less than 14.0%, the resulting elastic polyurethane fiber exhibits an unsatisfactory recovery stress and an unsatisfactory heat resistance. On the other hand, if the polyurethaneurea has a hard segment content of more than 25.0%, the resulting elastic polyurethane fiber has an extremely low elongation at break. Thus, the polyurethaneurea preferably has a hard segment content of from 15.5% to 22.0% inclusive, in view of the elongation at break, the recovery stress, and the heat resistance of the resulting elastic polyurethane fiber, and the stability of the polyurethane solution. Preferably, the urethane moieties have a number average molecular weight of 3000-6000, and the urea moieties have a number average molecular weight of 700-1200. Especially preferably, the urethane moieties have a number average molecular weight of 3000-4500, and the urea moieties have a number average molecular weight of 700-1000.

To produce a polyurethaneurea which includes urethane moieties having a desired number average molecular weight and urea moieties having a desired number average molecular weight, first, the copolyalkylene ether diol is reacted, in a bulk or inert solvent, with the diisocyanate in proportions to provide a polyurethaneurea which includes urethane moieties having a desired number average molecular weight, thereby preparing an urethane prepolymer which includes an unreacted isocyanate group at both ends of the molecular chain. The prepolymer reactant includes an urethane prepolymer which includes an unreacted isocyanate group at both ends of the molecular chain, and an unreacted diisocyanate.

The number average molecular weight of the copolyalkylene ether diol (Mdo) and a mole ratio of the diisocyanate to the copolyalkylene ether diol ($N_1$) have to be adjusted to control the number average molecular weight of the urethane moieties (Ms). The number average molecular weight of the urethane moieties (Ms) is calculated by Equation (2) below:

$$Ms = \{Mdo + Mdi(N_1 - N_0)\}/(N_1 - N_0 - 1) - 2Mdi \qquad \text{Equation (2)}$$

wherein Ms is the number average molecular weight of the urethane moieties; Mdo is the number average molecular weight of the copolyalkylene ether diol; Mdi is the molecular weight of the diisocyanate; $N_1$ is a mole ratio of the diisocyanate to the copolyalkylene ether diol; and $N_0$ is a mole ratio of the unreacted diisocyanate to the copolyalkylene ether diol in the urethane prepolymer reactant, the ratio being determined by Equation (3) below:

$$N_0 = aN_1^4 + bN_1^3 + cN_1^2 + dN_1 e \qquad \text{Equation (3)}$$

wherein a-e are a constant (a=0.03806, b=0.3997, c=1.617, d=−2.144, e=0.8795). $N_0$ in Equation (3) is a mole ratio of the unreacted diisocyanate to the copolyalkylene ether diol in the urethane prepolymer reactant, and determine according to the equation described in L. H. Peebles. Jr., "Macromolecules, 7 (6), 782-882, 1974".

In particular, to control the number average molecular weight of the urethane moieties (Ms), the molecular weight of the copolyalkylene ether diol to be used (Mdo) may be determined, and then a mole ratio of the diisocyanate to the copolyalkylene ether diol ($N_1$) may be designed to give a desired Ms value, which is calculated by Equation (2) above.

Next, the resultant urethane prepolymer is reacted with the diamine to prepare a polyurethaneurea. For the preparation, the number average molecular weight of the urea moieties can be adjusted by changing the amount of the unreacted diisocyanate in the urethane prepolymer. For the adjustment, the molecular weight of the diamine (Mda) and a mole ratio of the unreacted diisocyanate present in the chain extention reaction to the copolyalkylene ether diol ($N_3$) have to be adjusted. The unreacted diisocyanate present in the chain extention reaction may be the unreacted diisocyanate which is derived from a material added in excess before the prepolymer reaction and which is present in the prepolymer reactant, the unreacted diisocyanate which is additionally added after completion of the prepolymer reaction and in the chain extention reaction, or a combination thereof.

A mole ratio of the unreacted diisocyanate present in the chain extent ion reaction to the copolyalkylene ether diol ($N_3$) is calculated by Equation (4) below:

$$N_3 = N_0 + N_2 \qquad \text{Equation (4)}$$

wherein $N_0$ is a mole ratio of the unreacted diisocyanate in the urethane prepolymer reactant to the copolyalkylene ether diol, the mole ratio being calculated by Equation (3) above; and $N_2$ is a mole ratio of the diisocyanate additionally added in the chain extention reaction to the copolyalkylene ether diol (when no diisocyanate is additionally added, $N_2$ is 0).

As described above, when diisocyanate does not have to be additionally added in the chain extention reaction, $N_2$ is 0.

The number average molecular weight of the urea moieties (Mh) is calculated by Equation (5) below:

$$Mh = +\{Mda(N_1+N_3-N_0-1)+Mdi \times N_3\}/(N_1-N_0-1)+2Mdi \qquad \text{Equation (5)}$$

wherein Mh is the number average molecular weight of the urea moieties; Mda is the molecular weight of the diamine (when a combination of two or more diamines is used, Mda is the number average molecular weight of the diamines); Mdi is the molecular weight of the diisocyanate; $N_0$ is a mole ratio of the unreacted diisocyanate in the urethane prepolymer reactant to the copolyalkylene ether diol, the ratio being determined by Equation (3) above; $N_1$ is a mole ratio of the diisocyanate to the copolyalkylene ether diol; and $N_3$ is a mole ratio of the diisocyanate present in the chain extention reaction to the copolyalkylene ether diol, the ratio being calculated by Equation (4) above.

In particular, to control the number average molecular weight of the urea moieties (Mh), the molecular weight of the diamine to be used may be determined, and then a mole ratio of the unreacted diisocyanate present in the chain extention reaction to the copolyalkylene ether dial ($N_3$) may be designed to give a desired Mh value, which is calculated by Equation (5) above.

The urethane prepolymer including adjusted amount of the unreacted diisocyanate by the way described above may be diluted with on inert solvent to adjust the concentration, if necessary. Then, the prepolymer can be reacted with the diamine to form urea moieties, thereby preparing a polyurethaneurea which includes urea moieties having a desired number average molecular weight. The diamine may be diluted with an inert solvent. To control the molecular weight of the polyurethaneurea to be produced, a monoamine compound as a reaction terminator may be added to the diamine. Examples of the monoamine compound as a reaction stopper include diethylamine, diisopropylamine, diisobutylamine, and N-methylethylamine. The diethylamine is preferred in view of the ease of control of the molecular weight.

Examples of the inert solvent which can be used in production of the polyurethaneurea include N,N-dimethylacetamide and N,N-dimethylformamide. The N,N-dimethylacetamide is most preferred in view of ease of handling. As described above, the inert solvent may be present as a solvent in the urethane prepolymer reaction, may be additionally added to the urethane prepolymer for dilution, or may be present as a solvent for the diamine.

To the resultant polyurethaneurea solution, an additive such as a thermal stabilizer, an antioxidant, an anti-yellowing agent, and a chlorine-resist agent, or an inert solvent may be added for spinning, where necessary. Although the polyurethane-urea solution to be spun may include the polyurethaneurea at any level, the solution preferably includes 15-45% by weight of the polyurethaneurea, in view of ease of handling of the solution. The polyurethaneurea solution prepared as described above can be spun into elastic polyurethane fibers using a conventional dry or wet spinning process. To the resultant elastic polyurethane fibers, a polyalkylsiloxane, a polyether-modified silicone, an amino-modified silicone, a mineral oil, a mineral particle such as talc, powders of a higher aliphatic acid metal salt such as magnesium stearate, and paraffin, for example, can be applied individually or in combination, as an oil.

The resultant elastic polyurethane fibers exhibit suitable properties, when the fibers are measured for physical properties such as strength, elongation, hysteresis loss, and recovery stress, using, for example, a conventionally known Tensilon or autograph tension tester. Although the elastic polyurethane fiber of the present invention has a high recovery stress, the fiber suitable for use in a stretch fabric preferably has a specific recovery stress at 200% elongation in the third cycle in a repeated 300% stretch and recovery test of a value being equal to or more than a critical specific recovery stress defined by Equation (6) below:

$$\text{Critical Specific Recovery Stress } (cN/\text{dtex}) = 0.0320 - 6.43 \times 10^{-6} \times D \qquad \text{Equation (6)}$$

wherein D is the linear density (dtex) of the polyurethane elastic fiber.

The elastic polyurethane fiber preferably has an elongation at break of 450% or more and more preferably 500% or more, in view of ease of the process for processing the fiber into a fabric.

The elastic polyurethane fiber preferably has a lower hysteresis. A lower hysteresis loss indicates that the elastic polyurethane fiber has a large ratio of the recovery stress to the stretch stress. This corresponds to the polyurethane fiber having a large stress retention at 200% elongation calculated by Equation (7) below:

$$\text{Stress Retention at 200\% Elongation } (\%) = f_R/f_S \times 100 \qquad \text{Equation (7)}$$

wherein $f_R$ is R-modulus (cN) at 200% elongation in the third cycle in a repeated 0%-300% stretch and recovery test; and $f_S$ is S-modulus (cN) at 200% elongation in the third cycle in a repeated 0%-300% stretch and recovery test, the S-modulus and the R-modulus representing stretch stress and recovery stress in the repeated stretch to respectively. The elastic polyurethane fiber preferably has a stress retention at 200% elongation of 45% or more, more preferably 55% or more, and still more preferably 60% or more, in view of a preferred combination of the ease in putting on stretch fabric clothing made using the elastic polyurethane fiber and the fit of the clothing during wear.

The elastic polyurethane fiber of the present invention has a high heat resistance. Generally, when an elastic polyurethane fiber is processed into a fabric, the fiber is heat-treated in a dyeing step and a heat setting step. Although the heat treatment conditions vary depending on, for example, the type of a fiber used in combination with the elastic polyurethane fiber, the application and the intended use of the fabric, the elastic polyurethane fiber of the present invention can retain a high recovery stress even after such beat treatment.

The elastic polyurethane fiber of the present invention has a high recovery stress, a low hysteresis loss, and a high heat resistance, and thus is suitably used in sport clothing such as swimming costumes and stockings, general stretch fabric clothing such as innerwear, outerwear, and stockings, hygienic articles such as diapers, and industrial materials.

As used herein, the term "stretch fabric" refers to knitted fabrics such as circular knitted fabrics, weft knitted fabrics, and warp knitted fabrics, and general textiles which are made using the elastic polyurethane fiber. Examples of knitted structures which can be used for the circular knitted fabrics and the weft knitted fabrics include basic plain knitted structures and tuck knitted, float knitted, half cardigan, lace knitted, platted, and jacquard structures. Examples of the knitted structures which can be used for warp knitted fabrics include basic structures such as chain knitted, tricot knitted, cord knitted, atlas knitted, and insertion knitted structures, and combinations thereof. When another elastic fiber is used in combination with the elastic polyurethane fiber to produce a stretch fabric, the another fiber may be included in the overall surface of the fabric or at desired intervals. The another elastic fiber may also be inserted into the fabric.

A circular knitted fabric is prepared using a knitting machine with a yarn feeder which has many feeding ports and which can feed plural yarns simultaneously, such as a standard single knit circular knitting machine with a single array of needles and a standard double knit circular knitting machine with double arrays of needles. Usually, a 5-50 gauge knitting machine is used, although the gauge may be selected in accordance with the intended use. A weft knitted fabric is knitted using a weft knitting machine such as a large weft knitting machine, a small weft knitting machine, a pearl knitting machine, an interlock knitting machine, and a jacquard loom and a full fashioned knitting machine such as a single needle knitting machine and a double needle knitting machine. Usually, a 3-50 gauge knitting machine is used, although the gauge may be selected in accordance with the intended use.

A warp knitted fabric is prepared by warp knitting machine. In particular, an elastic fiber and/or a covered elastic yarn and an inelastic fiber are individually wound onto a beam, in an amount suitable for producing an intended product, by using, for example, Karl Mayer warper or Liba warper. Then the beams are mounted in a knitting machine described below, and the elastic fiber and/or the covered elastic yarn or the inelastic fiber are knitted into a desired warp knitted fabric. A warp knitted fabric can be prepared using a tricot knitting machine, a raschel knitting machine, or a double raschel knitting machine. The linear density of the optional yarn to be used and the type and the gauge of the knitting machine may be selected in accordance with the linear density of the yarns to be used and the purposes of the product to be produced. Any of the basic knitted structures as described above or a combination thereof can be used. When a tricot knitting machine is used, a half tricot structure formed in a loom with two reeds, a satin tricot structure, or a jacquard structure, or a combination thereof is employed to prepare a desired warp knitted fabric. When a raschel or a double raschel knitting machine is used, a power net structure, a satin net structure, or a jacquard structure is employed to prepare a desired warp knitted fabrics. When a tricot knitting machine or a raschel a knitting machine is used, yarns may be knitted using three or more reeds. Usually, a 10-50 gauge knitting machine is used, although the gauge may be selected in accordance with the intended use.

The woven fabrics are made by weaving one or more fibers selected from, for example, natural fibers such as cotton and linen fibers, regenerated cellulosic fibers such as viscose rayon fibers, cuprammonium rayon fibers under the trade name of, for example, Cupro, and certain cellulose fibers under the trade name of Tencel, and synthetic fibers such as polyester, polyamide, and PVA fibers in a common procedure. The woven fabrics may be prepared using a combination of the elastic polyurethane fiber with another elastic polyurethane fiber or polyester-based elastic fiber such as polytrimethylene terephthalate-based and polybutylene terephthalate-based fibers. Although a fabric prepared from only the elastic polyurethane fiber (bare yarns) may be weaved, it is preferred to use a yarn prepared from a combination of the elastic polyurethane fiber and another fiber, in view of, for example, durability and feeling. Examples of a process for combining fibers include paralleling, air covering, covering, and plying. The elastic polyurethane fiber may be combined with one or more fibers. The resultant composite yarn may be steam-set in a generally known procedure. The composite yarn may be prepared by a conventionally known process, and a conventionally known sizing agent or wax may be used. The fibers may be arranged in a usually known manner which may be selected in accordance with the structure and the density. For example, a composite yarn may be prepared by arranging 10 elastic fibers other than the elastic fiber of the present invention per the fiber of the present invention. The yarns may be weaved using a conventionally known loom such as, for example, a WJL, an AJL, and a rapier.

A gray circular knitted fabric, a gray weft knitted fabric, a gray warp knitted fabric, and a gray textile may be opened and relaxed. Then the fabrics may be dyed and subjected to a finishing step including resinating, as commonly known.

The resultant stretch fabric is suitable for use for, for example, innerwear such as short panties, shirts, camisoles, slips, body suits, briefs, trunks, undergarments, girdles, brassieres, spats, belly bands, pantyhose, stockings, and hose; sport clothing such as athletic wear including swimming costumes, training wear, leotards, and skiwear and outdoor wear; outerwear such as T-shirts, jackets, sweaters, vests, pants, skirts, cut and sewn, coats, and jumpers; accessories such as gloves, hats, and mufflers; nightwear such as pajamas and nightgowns; and nursing-care wear.

EXAMPLES

Now, the present invention will be specifically described with reference to Examples, although the present invention is not limited thereto.

(1) Method for Determining Number Average Molecular Weight of Urethane Moieties and Urea moieties and Hard Segment Content The elastic polyurethane fiber is washed with petroleum ether to remove the finishing oil. Then the fiber is purified by Soxhlet extraction using chloroform as solvent to remove the organic compound-based additive. The chloroform is removed by drying, and the fiber is measured using the instrument and the conditions as described below.

Measurement Instrument: Bruker Avance II
Observed Nucleus: 1H
Resonance Frequency: 400 MHz
Number of Accumulation: 128
Measurement Temperature: 25° C.
Solvent: Deuterated Dimethylformamide
Measurement Concentration: 1.5% by Weight.
Chemical Shift Standard: Tetramethylsilane (0 ppm)

FIG. 3 illustrates an exemplary NMR spectrum measured in the above conditions. The following is an exemplary method for measuring the number average molecular weight of the urethane moieties and the urea moieties and the hard segment content of an elastic polyurethane fiber prepared from a polyurethaneurea prepared using 4,4'-diphenylmethane diisocyanate as the diisocyanate. In FIG. 3, the curve P illustrates the NMR spectrum, and the curves I illustrate the integral, of the spectrum. The spectrum has a peak representing the methylene group in 4,4'-diphenylmethane diisocyanate including an urethane linkage at both ends (f1) at 3.872 ppm, a peak representing the methylene group in 4,4'-diphenylmethane diisocyanate including an urethane linkage at one end and an urea linkage at the other end (f2) at 3.839 ppm, and a peak representing the methylene group in 4,4'-diphenylmethane diisocyanate including an urea linkage at both ends (f3) at 3.805 ppm. The heights of the integral curves of the peaks f1, f2, and f3 are referred to as F1, F2, and F3, respectively.

In FIG. 2 illustrating an exemplary structural formula of an urethane moiety and an urea moiety of the polyurethane of the present invention, $R_1$ represents a residue of the copolyalkylene ether dial, $R_2$ represents a residue of the 4,4'-diphenylmethane diisocyanate, $R_3$ represents a residue of the diamine, f1 indicates the position of the methylene group in 4,4'-diphenylmethane diisocyanate including an urethane linkage at both ends, f2 indicates the position of the methylene group in 4,4'-diphenylmethane diisocyanate including an urethane linkage at one end and, an urea linkage at the other end, and f3 indicates the position of the methylene group in 4,4'-diphenylmethane diisocyanate including an urea linkage at both ends. The f1, f2, and f3 correspond to the peaks f1, f2, and f3 in FIG. 3, respectively. In the structural formula of FIG. 2, the average, number of repeating urethane moieties (n) and the average number of repeating urea moieties (m) can be calculated by Equations (8) and (9) below, respectively:

$$n = 2 \times (F1/F2) \quad \text{Equation (8)}$$

$$m = 2 \times (F3/F2) \quad \text{Equation (9)}$$

The number average molecular weight of the urethane moieties (Ms) and the number average molecular weight of the urea moieties (Mh) can be calculated by Equations (10) and (11) below, respectively.

$$Ms = (Mdo + Mdi) \times n + Mdo \quad \text{Equation (10)}$$

$$Mh = (Mda + Mdi) \times m + Mda + 2Mdi \quad \text{Equation (11)}$$

In Equations (10) and (11), Mdo is the number average molecular weight of the copolyalkylene ether diol, Mdi is the molecular weight of the 4,4'-diphenylmethane diisocyanate, and Mda is the molecular weight of the diamine (when a combination of two or more diamines is used Mda is the number average molecular weight of the diamines).

(2) Method for Evaluating Viscosity Stability of Polyurethane Solution

The polyurethane solution is placed into a closed container to avoid solvent vaporization and allowed to stand still in a 50° C. safety oven (SPH-200 from Tabai Espec Corp.) for 15 days. Before and after standing still at 50° C. for 15 days, the viscosity of the polyurethane solution is measured using a rotational viscometer (BH Viscometer from Tokyo Keiki Inc.). The viscosity increase value $\Delta\eta$ is used as an indicator of the viscosity stability. A smaller $\Delta\eta$ indicates that the polyurethane solution can be stably spun into fibers without, for example, fiber breakage.

(3) Method for Measuring Breaking Tenacity, Elongation at Break, S-modulus, R-modulus, Specific Recovery Stress at 200% Elongation, and Hysteresis Loss of Elastic Polyurethane Fiber A test fiber having a length of 50 mm is pulled at a rate of 500 mm/min at a temperature of 20° C. and a relative humidity of 65% using a tension tester (RTG-1210 Tensilon tester from Orientec Co., Ltd.) to measure the breaking tenacity and the elongation. The breaking tenacity and the elongation are measured 10 times per one test fiber, and the measurements are averaged.

In a repeated 0-300% stretch and recovery test, an S-modulus, which is a stretch stress, and an R-modulus, which is a recovery stress, of a test fiber having a length of 50 mm are measured when the test fiber is stretched to 200% elongation at a rate of 500 mm/min in the third cycle in the test. The R-modulus at 200% elongation in the third cycle is divided by the linear density (dtex) of the test fiber to determine the specific recovery stress at 200% elongation of the elastic polyurethane fiber. The stress retention at 200% elongation is determined by calculating a ratio of the R-modulus to the S-modulus at 200% elongation in the third cycle, using Equation (7) below:

$$\text{Stress Retention at 200\% Elongation (\%)} = f_R/f_S \times 100 \quad \text{Equation (7)}$$

wherein $f_R$ is the R-modulus (cN) at 200% elongation in the third cycle in a repeated 0-300% stretch and recovery test, $f_S$ is the S-modulus (cN) at 200% elongation in the third cycle in a repeated 0-300% stretch and recovery test. The resultant value is used as an indicator of the hysteresis loss. A larger stress retention at 200% elongation indicates that the elastic polyurethane fiber has a lower hysteresis loss. The stress retention at 200% elongation is determined 5 times per test fiber, and the resultant values are averaged.

(4) Method for Heat-Treating and Measuring Heat Resistance of Elastic Polyurethane Fiber A test fiber is clamped, at a grip distance of 50 mm, to a metal frame baring a side which is free to change in length. The positions at which the fiber is clamped at a grip distance of 50 mm are marked, and the 50 mm is considered as the initial length of the test fiber. Next, the movable side of the metal frame is moved so that the length between the clamped positions of the test fiber is changed to 100 mm. Then the fiber is heated, together with the metal frame, in an oven at 190° C. for one minute. The metal frame is removed from the oven, and the movable side of the frame is returned to the initial position and fixed. Then the test fiber is removed. The resultant fiber is heat-set due to the heat treatment, and the distance between the marks is longer than the initial length of 50 mm. The marks made on the heat-set test fiber before the heat treatment are clamped between the jaws of a tension tester (RTG-1210 Tensilon tension tester from Orientec Co., Ltd.) with an initial jaw separation length of 50 mm, and a repeated 0-300% stretch and recovery test is performed at a rate of 500 mm/min at a temperature of 20° C. and a relative humidity of 65% to determine the R-modulus at 200% elongation in the third cycle in the repeated test. A ratio of the R-modulus at 200% elongation after the heat treatment to the R-modulus at 200% elongation before the heat treatment is referred to as retention after heat treatment, which is used as an indicator of the heat resistance. A higher retention after heat treatment indicates that the elastic polyurethane fiber has a higher heat resistance. The heat treatment and the measurement of the R-modulus at 200% elongation after the heat treatment of a test fiber are performed 5 times per test fiber, and the measurements are averaged.

(5) Method for Determining Physical Properties of Extracted Fiber

An elastic fiber is extracted from a stretch fabric (such fiber is referred to as "extracted fiber") and measured as described below.

The total weight (g) of five extracted fibers having a length of 100 mm (W) is measured, and the linear density (dtex) of the extracted fibers is calculated by Equation (10) below:

$$\text{Linear Density (dtex) of Extracted Fibers} = 10,000 \times W/0.5 \quad \text{Equation (10)}$$

Next, in a repeated 0-300% stretch and recovery test, an S-modulus, which is a stretch stress, and an R-modulus, which is a recovery stress, of the extracted fiber are measured using a tension tester (RTG-1210 Tensilon tension tester from Orientec Co., Ltd.) with an initial jaw separation of 50 mm, when the fiber is stretched to 200% elongation at a rate of 500 mm/min at a temperature of 20° C. and a relative humidity of 65% in the third cycle in the test. The resultant R-modulus is divided by the linear density as determined above to determine the recovery strength at 200% elongation in the third cycle in the repeated 300% stretch and recovery test. The recovery strength is measured 5 times per test fiber, and the measurements are averaged.

Example 1

1800 g (1 mole) of a copolyalkylene ether dial which includes a tetramethylene (group and a 2,2-dimethylpropylene group, which has a number average molecular weight of 1800, and which includes the 2,2-dimethylpropylene group in a molar amount of 10 mole % and 477.0 g (1.905 mole) of 4,4'-diphenylmethane diisocyanate, which is referred to as MDI-1 in Table 1 were reacted by stirring at 60° C. for 3 hours in a dry nitrogen atmosphere an give an urethane prepolymer including isocyanate at an end. The prepolymer was cooled to room temperature, and then 2783 g of dimethylacetamide, which is referred to as DMAc-1 in Table 1, was added and stirred at room temperature to give a homogeneous prepolymer solution.

On the other hand, a solution of 64.9 g (0.876 mole) of 1,2-diaminopropane as a diamine and 4.27 g (0.0584 mole) of diethylamine as a terminator in 1980 g of dimethylacetamide, which is referred to as DMAc-2 in Table 1, was added all at once to the prepolymer solution with rapid stirring, and allowed to react at room temperature for an hour to give a polyurethane solution having a viscosity of 3500 poise at 30° C.

Evaluation of the viscosity stability of the polyurethane solution illustrated that the solution had a viscosity increase value $\Delta\eta$ after standing still at 50° C. for 15 days of 230 poise, indicating that the solution was stable.

As additives, 1% by weighs of a condensation product of p-cresol, dicyclopentadiene, and isobutylene relative to the solid content of the polyurethane polymer, 0.2% by weight of 2-[2-hydroxy-3,5-bis($\alpha,\alpha$-dimethylbenzyl)phenyl]-2H-benzotriazole relative to the solid content of the polyurethane polymer, and 0.3% by weight of hydrotalcit relative to the solid content of the polyurethane polymer were added to the polyurethane solution to give a homogeneous solution. The polyurethane solution including the additives added were degassed at room temperature under reduced pressure to give a spinning solution having a viscosity of 3000 poise.

The spinning solution was spun through a spinneret including four orifices into a heated nitrogen gas atmosphere at a temperature of 270° C. A draft of 1.15× was given between a godet roller and an take-up bobbin which was taken up at 680 m/min, while applying dimethyl silicone-based oil, to give an elastic polyurethane fiber having a linear density of 44 dtex.

NMR analysis of the elastic polyurethane fiber gave the spectrum illustrated in FIG. 3. F1, F2 and F3, which are the heights of the integral curves of the peaks f1, f2, and f3, respectively, were 5.2, 10.4, and 4.0, respectively. The average number of repeating urethane moieties (n) was calculated, using the resultant values, to be 1.00, while the average number of repeating urea moieties (m) was calculated to be 0.77. The number average molecular weight of the urethane moieties, the number average molecular weight of the urea moieties, and the hard segment content of the polyurethaneurea were calculated to be 3850, 820, and 17.6%, respectively. When the material feed ratio was used in calculation by Equations (2) and (5) above, the number average molecular weight of the urethane moieties was 3820, the number average molecular weight of the urea moieties was 833, and the hard segment content was 17.9%. The values calculated using the feed ratio were in good agreement with the values given by the NMR analysis.

The elastic polyurethane fiber had a breaking tenacity of 52 cN, an elongation at break of 620%, an S-modulus at 200% elongation of 2.8 cN, an R-modulus at 200% elongation of 1.8 cN, a specific recovery stress at 200% elongation of 0.041 cN/dtex, and a stress retention at 200% elongation of 64%. The elastic polyurethane fiber after the heat treatment had an R-modulus at 200% elongation of 1.5 cN and a retention after heat treatment of 83%. The physical property measurements of the elastic polyurethane fiber are illustrated in Table 2.

A yarn produced by combining the elastic polyurethane fiber with an 84 dtex fiber including 36 filaments or polyester was knitted at a draft of 3 on a 28-gauge 30-inch diameter single circular knitting machine having 2640 needles to make a polyurethane/polyester blend fabric. The fabric was relaxed at 80° C. for 5 minutes according to routine procedures and then dry heat-preset at 195° C. for a minute on a setter. The fabric was subjected to boiling treatment at 130° C., for 30 minutes in a jet dye machine and then finished at 170° C. for a minute on a setter to provide a stretch fabric.

An elastic polyurethane fiber extracted from the stretch fabric had a linear density of 16.9 dtex, an R-modulus at 200% elongation of 1.5 cN, and a specific recovery stress at 200% elongation of 0.091 cN/dtex. The physical properties of the extracted fiber are illustrated in Table 2.

Examples 2-13

A polyurethane solution was prepared in the same manner as in Example 1, except that the respective materials and the respective feed ratio illustrated in Table 1 below were used, and then spun in the same manner as in Example 1 to give an elastic polyurethane fiber having a linear density of 44 dtex.

In the Examples 4, 7, 8, 10, and 12, a copolyalkylene ether dial and 4,4"-diphenylmethane diisocyanate, which is referred to as MDI-1 in Table 1, were reacted to give an urethane prepolymer including isocyanate at an end. Then the prepolymer was cooled to room temperature, and additional 4,4'-diphenylmethane diisocyanate, which is referred to as MDI-2 in Table 1, and dimethylacetamide, which is referred to as DMAc-1 in Table 1, were added and stirred at room temperature to pave a homogeneous prepolymer solution.

On the other hand, in Examples 5-13, a combination of two diamine: the respective primary diamine and the respective secondary diamine illustrated in Table 1 in the respective amount illustrated in Table 1, and diethylamine were dissolved in dimethylacetamide, which is referred to as DMAc-2 in Table 1. Then the resultant solution was added to the prepolymer solution and allowed to react to give a polyurethane solution.

The results of evaluation and analysis of the resultant elastic polyurethane fiber are illustrated in Table 2 below.

Comparative Examples 1-4

In Comparative Examples 1, 2, 3, and 4, a polyurethane solution was prepared in the same manner as in Examples 1, 4, 5, and 5, respectively, except that the respective materials and the respective feed ratio illustrated in Table 1 were used, and spun in the same manner as in Example 1 to give an elastic polyurethane fiber having a linear density of 44 dtex. The results of evaluation and analysis of the resultant elastic polyurethane fiber are illustrated in Table 2 below.

TABLE 1

| | | Copolyalkylene Ether Diol | | | MDI | | Diamine | | | |
| | | | | | | | | Primary Diamine | | |
| | | Type | Copolymerization Ratio | Molecular Weight | Number of Moles | MDI-1 Number of Moles | MDI-2 Number of Moles | Type | Type | Molar Amount | Number of Moles |
|---|---|---|---|---|---|---|---|---|---|---|---|
| Example | 1 | TM/DMP | 90/10 | 1800 | 1 | 1.905 | 0 | Single | 1,2-DAP | 100% | 0.876 |
| | 2 | TM/DMP | 90/10 | 1800 | 1 | 1.750 | 0 | Single | EDA | 100% | 0.722 |
| | 3 | TM/DMP | 90/10 | 1800 | 1 | 1.730 | 0 | Single | 1,2-DAP | 100% | 0.701 |
| | 4 | TM/DMP | 90/10 | 1800 | 1 | 1.780 | 0.056 | Single | 1,2-DAP | 100% | 0.807 |
| | 5 | TM/DMP | 90/10 | 1800 | 1 | 2.115 | 0 | Combination | EDA | 80% | 0.868 |
| | 6 | TM/DMP | 90/10 | 1800 | 1 | 2.300 | 0 | Combination | EDA | 60% | 0.868 |
| | 7 | TM/DMP | 90/10 | 1800 | 1 | 1.772 | 0.139 | Combination | EDA | 85% | 0.749 |
| | 8 | TM/DMP | 90/10 | 1800 | 1 | 1.724 | 0.596 | Combination | EDA | 80% | 1.031 |
| | 9 | TM/DMP | 85/15 | 2000 | 1 | 2.020 | 0 | Combination | EDA | 87% | 0.859 |
| | 10 | TM/3MeP | 95/7 | 1800 | 1 | 1.772 | 0.132 | Combination | EDA | 82% | 0.717 |
| | 11 | TM/DMP | 90/10 | 1800 | 1 | 1.769 | 0 | Combination | EDA | 85% | 0.629 |
| | 12 | TM/DM | 80/20 | 2000 | 1 | 1.918 | 0.082 | Combination | EDA | 85% | 0.740 |
| | 13 | TM/DMP | 90/10 | 1800 | 1 | 2.115 | 0 | Combination | EDA | 85% | 0.922 |
| Comparative Example | 1 | TM | — | 1800 | 1 | 1.905 | 0 | Single | 1,2-DAP | 100% | 1.080 |
| | 2 | TM/DMP | 90/10 | 1800 | 1 | 1.307 | 0.138 | Single | EDA | 100% | 0.418 |
| | 3 | TM/DMP | 90/10 | 1800 | 1 | 1.772 | 0.993 | Combination | EDA | 50% | 0.624 |
| | 4 | TM | — | 1800 | 1 | 1.772 | 0.139 | Combination | EDA | 85% | 0.749 |

| | | Diamine Secondary Diamine | | | Diethylamine | Solvent | | Value Calculated Using Material Feed Ratio | | |
| | | Type | Mole Amount | Number of Moles | Number of Moles | DMAC-1 Amount (g) | DMAC-2 Amount (g) | Number Average Molecular Weight of Urethane Moieties | Number Average Molecular Weight of Urea Moieties | Hard Segment Content |
|---|---|---|---|---|---|---|---|---|---|---|
| Example | 1 | — | — | — | 0.0584 | 2783 | 1980 | 3820 | 833 | 17.9 |
| | 2 | — | — | — | 0.0570 | 2735 | 1905 | 4250 | 761 | 15.2 |
| | 3 | — | — | — | 0.0571 | 2729 | 1918 | 4319 | 778 | 15.3 |
| | 4 | — | — | — | 0.0580 | 2762 | 1956 | 4153 | 833 | 16.7 |
| | 5 | 1,2-DAP | 20% | 0.217 | 0.0600 | 2847 | 2030 | 3432 | 877 | 20.4 |
| | 6 | 1,2-DAP | 40% | 0.508 | 0.0605 | 2904 | 2098 | 3191 | 940 | 22.7 |
| | 7 | 1,2-DAP | 15% | 0.132 | 0.0587 | 2785 | 1961 | 4178 | 865 | 17.2 |
| | 8 | NEEDA | 20% | 0.258 | 0.0615 | 2910 | 2105 | 4340 | 1184 | 21.4 |
| | 9 | 1,2-DAP | 13% | 0.128 | 0.0643 | 3062 | 2158 | 3962 | 846 | 17.6 |
| | 10 | 1,3-DAP | 18% | 0.157 | 0.0584 | 2782 | 1960 | 4178 | 861 | 17.1 |
| | 11 | 1,2-DAP | 15% | 0.111 | 0.0572 | 2741 | 1914 | 4187 | 770 | 15.5 |
| | 12 | 1,2-DAP | 15% | 0.131 | 0.0580 | 2751 | 1937 | 4185 | 866 | 17.1 |
| | 13 | 3Me-DAP | 15% | 0.163 | 0.0594 | 2847 | 2042 | 3432 | 889 | 20.6 |
| Comparative Example | 1 | — | — | — | 0.0586 | 2783 | 1980 | 3820 | 808 | 17.5 |
| | 2 | — | — | — | 0.0547 | 2642 | 1806 | 7990 | 885 | 9.2 |

TABLE 1-continued

| | | | | | | | | | | |
|---|---|---|---|---|---|---|---|---|---|---|
| 3 | NEEDA | 50% | 0.635 | 0.0608 | 2904 | 2120 | 4178 | 1489 | 26.3 |
| 4 | 1,2-DAP | 15% | 0.132 | 0.587 | 2785 | 1961 | 4178 | 865 | 17.2 |

TM: tetramethylene
DM: dimethylene
DMP: 2,2-dimethylpropylene
3MeP: 3-methylpentamethylene
EDA: ethylenediamine
1,2-DAP: 1,2-diaminopropane
1,3-DAP: 1,3-diaminopropane
NEEDA: N-ethylethylediamine
3Me-DAP: 3-methyl-1,5-diaminopentane

TABLE 2

| | | NMR Measurements | | | | | | | Physical Properties of Elastic Polyurethane Fiber | | |
|---|---|---|---|---|---|---|---|---|---|---|---|
| | | Viscosity Stability (Δη) in Poise | F1 | F2 | F3 | n | m | Number Average Molecular Weight of Urethane Moieties | Number Average Molecular Weight of Urea Moieties | Hard Segment Content | Breaking Tenacity in cN | Elongation at Break in % | S-Mod at 200% Elongation in cN |
| Example | 1 | 230 | 5.2 | 10.4 | 4.0 | 1.00 | 0.77 | 3850 | 820 | 17.6 | 52 | 620 | 2.8 |
| | 2 | 20 | 6.1 | 10.1 | 3.2 | 1.21 | 0.63 | 4280 | 760 | 15.1 | 48 | 660 | 2.6 |
| | 3 | 10 | 6.2 | 9.9 | 3.0 | 1.25 | 0.61 | 4370 | 770 | 15.0 | 49 | 680 | 2.5 |
| | 4 | 40 | 5.3 | 9.2 | 3.1 | 1.15 | 0.67 | 4160 | 790 | 16.0 | 55 | 640 | 2.8 |
| | 5 | 380 | 4.0 | 9.9 | 4.8 | 0.81 | 0.97 | 3460 | 870 | 20.1 | 59 | 590 | 3.1 |
| | 6 | 450 | 3.2 | 9.2 | 5.4 | 0.70 | 1.17 | 3230 | 940 | 22.5 | 50 | 550 | 3.0 |
| | 7 | 150 | 6.3 | 10.4 | 4.9 | 1.21 | 0.94 | 4280 | 860 | 16.7 | 52 | 620 | 2.8 |
| | 8 | 240 | 5.1 | 8.1 | 7.7 | 1.26 | 1.90 | 4380 | 1170 | 21.1 | 51 | 590 | 3.0 |
| | 9 | 70 | 4.7 | 10.5 | 4.7 | 0.90 | 0.90 | 4010 | 840 | 17.3 | 53 | 660 | 2.9 |
| | 10 | 190 | 6.0 | 10.2 | 4.8 | 1.18 | 0.94 | 4210 | 860 | 17.0 | 49 | 630 | 2.8 |
| | 11 | 30 | 6.0 | 10.1 | 3.3 | 1.19 | 0.65 | 4240 | 770 | 15.4 | 48 | 670 | 2.6 |
| | 12 | 490 | 5.3 | 10.5 | 5.0 | 1.01 | 0.95 | 4270 | 860 | 16.8 | 43 | 580 | 2.8 |
| | 13 | 90 | 4.3 | 10.5 | 4.7 | 0.82 | 0.90 | 3480 | 850 | 19.6 | 40 | 640 | 2.8 |
| Comparative Example | 1 | 420 | 5.4 | 10.8 | 4.2 | 1.00 | 0.78 | 3850 | 800 | 17.2 | 56 | 610 | 2.9 |
| | 2 | 20 | 12.5 | 8.2 | 3.1 | 3.05 | 0.76 | 8050 | 800 | 9.0 | 50 | 650 | 1.6 |
| | 3 | 2530 | 4.2 | 7.2 | 10.1 | 1.17 | 2.81 | 4190 | 1490 | 26.2 | 45 | 470 | 2.7 |
| | 4 | 170 | 6.0 | 10.0 | 4.7 | 1.20 | 0.94 | 4260 | 850 | 16.8 | 50 | 610 | 2.9 |

| | | Physical Properties of Elastic Polyurethane Fiber | | | | | Physical Properties of Extracted Fiber | | |
|---|---|---|---|---|---|---|---|---|---|
| | | R-Mod at 200% Elongation in cN | Specific Recovery Stress at 200% Elongation in cN/dtex | Stress Retention at 200% Elongation in % | R-Mod at 200% Elongation After Heat Treatment in cN | Retention After Heat Treatment in % | Linear Density in dt | R-Mod at 200% Elongation in cN | Specific Recovery Stress at 200% Elongation in cN/dtex |
| Example | 1 | 1.8 | 0.041 | 64 | 1.5 | 83 | 16.9 | 1.5 | 0.091 |
| | 2 | 1.6 | 0.036 | 62 | 1.3 | 81 | 17.0 | 1.4 | 0.080 |
| | 3 | 1.6 | 0.036 | 64 | 1.2 | 75 | 17.1 | 1.2 | 0.069 |
| | 4 | 1.9 | 0.043 | 68 | 1.6 | 84 | 16.7 | 1.5 | 0.090 |
| | 5 | 2.1 | 0.048 | 68 | 1.6 | 76 | 16.2 | 1.5 | 0.092 |
| | 6 | 2.0 | 0.045 | 67 | 1.4 | 70 | 16.0 | 1.4 | 0.087 |
| | 7 | 1.8 | 0.041 | 64 | 1.4 | 78 | 16.9 | 1.4 | 0.082 |
| | 8 | 1.7 | 0.039 | 57 | 1.3 | 76 | 15.5 | 1.2 | 0.079 |
| | 9 | 1.8 | 0.041 | 62 | 1.4 | 78 | 16.9 | 1.4 | 0.083 |
| | 10 | 1.7 | 0.039 | 61 | 1.2 | 71 | 17.1 | 1.2 | 0.070 |
| | 11 | 1.6 | 0.036 | 62 | 1.1 | 69 | 16.8 | 1.1 | 0.068 |
| | 12 | 1.6 | 0.036 | 57 | 1.0 | 63 | 16.0 | 1.1 | 0.069 |
| | 13 | 1.9 | 0.043 | 68 | 1.2 | 63 | 16.4 | 1.2 | 0.073 |
| Comparative Example | 1 | 1.2 | 0.027 | 41 | 0.85 | 71 | 16.0 | 0.6 | 0.040 |
| | 2 | 1.1 | 0.025 | 69 | 0.59 | 54 | 16.7 | 0.8 | 0.048 |
| | 3 | 1.8 | 0.041 | 67 | 0.56 | 31 | 17.3 | 0.8 | 0.047 |
| | 4 | 1.1 | 0.025 | 38 | 0.67 | 61 | 16.5 | 0.7 | 0.042 |

INDUSTRIAL APPLICABILITY

The elastic polyurethane fiber of the present invention has a high recovery stress, a low hysteresis loss, and a high heat resistance, and can be suitably used in, for example, sport clothing, general clothing such as innerwear, outerwear, and stockings, hygienic articles such as diapers, and industrial materials.

The invention claimed is:
1. An elastic polyurethane fiber comprising a polyurethaneurea which is prepared from a copolyalkylene ether diol comprising two or more linear $C_{2-10}$ alkylene groups and/or branched $C_{2-10}$ alkylene groups, a diisocyanate, and a diamine, wherein the polyurethaneurea has a hard segment content of from 14.0% to 25.0% inclusive, as defined by Equation (1) below:

Hard Segment Content (%)=(Number Average Molecular Weight of Urea Moieties)/{(Number Average Molecular Weight of Urethane Moieties)+(Number Average Molecular Weight of Urea Moieties)}×100      Equation (1), and wherein the urethane moieties have a number average molecular weight of 3000-4500, and the urea moieties have a number average molecular weight of 700-1200.

2. The elastic polyurethane fiber according to claim 1, wherein the polyurethaneurea has a hard segment content of from 15.5% to 22.0% inclusive.

3. The elastic polyurethane fiber according to claim 1 or 2, wherein the diamine is a combination of two linear or branched aliphatic diamines which are different from each other and each of which comprises, between the two amino groups, an alkyl moiety containing 3 or less carbon atoms.

4. The elastic polyurethane fiber according to claim 3, wherein one of the two diamines is used in a molar amount of 2-20 mole % based on the total moles of the diamines.

5. The elastic polyurethane fiber according to claim 1 or 2, wherein the copolyalkylene ether diol has a number average molecular weight of 1000-3000.

6. The elastic polyurethane fiber according to claim 1 or 2, wherein the copolyalkylene ether diol comprises a tetramethylene group and a branched alkylene group.

7. The elastic polyurethane fiber according to claim 1 or 2, wherein the fiber has a specific return-200% stress observed in the third cycle of 0-300% elongation-contraction repeating cycles, being equal to or more than a critical specific recovery stress defined by Equation (6) below:

Critical Specific Recovery Stress $(cN/dtex)=0.0320-6.43\times10^{-6}\times D$      Equation (6)

wherein D is the linear density (dtex) of the polyurethane elastic fiber.

8. A process for producing the elastic polyurethane fiber according to claim 1 or 2, the process comprising:

reacting a copolyalkylene ether diol comprising two or more linear $C_{2-10}$ alkylene groups and/or branched $C_{2-10}$ alkylene groups, with a diisocyanate to synthesize an urethane prepolymer including isocyanate at both ends, adding a diamine to the resultant urethane prepolymer in an inert solvent to produce a polyurethaneurea solution which contains the polyurethaneurea, and dry spinning the resultant polyurethaneurea solution to produce the elastic polyurethane fiber.

\* \* \* \* \*